Nov. 8, 1960 P. F. MARX 2,959,692
PROTECTIVE DEVICE FOR INSULATING COUPLING IN PIPE LINE
Filed Jan. 2, 1958 2 Sheets-Sheet 2

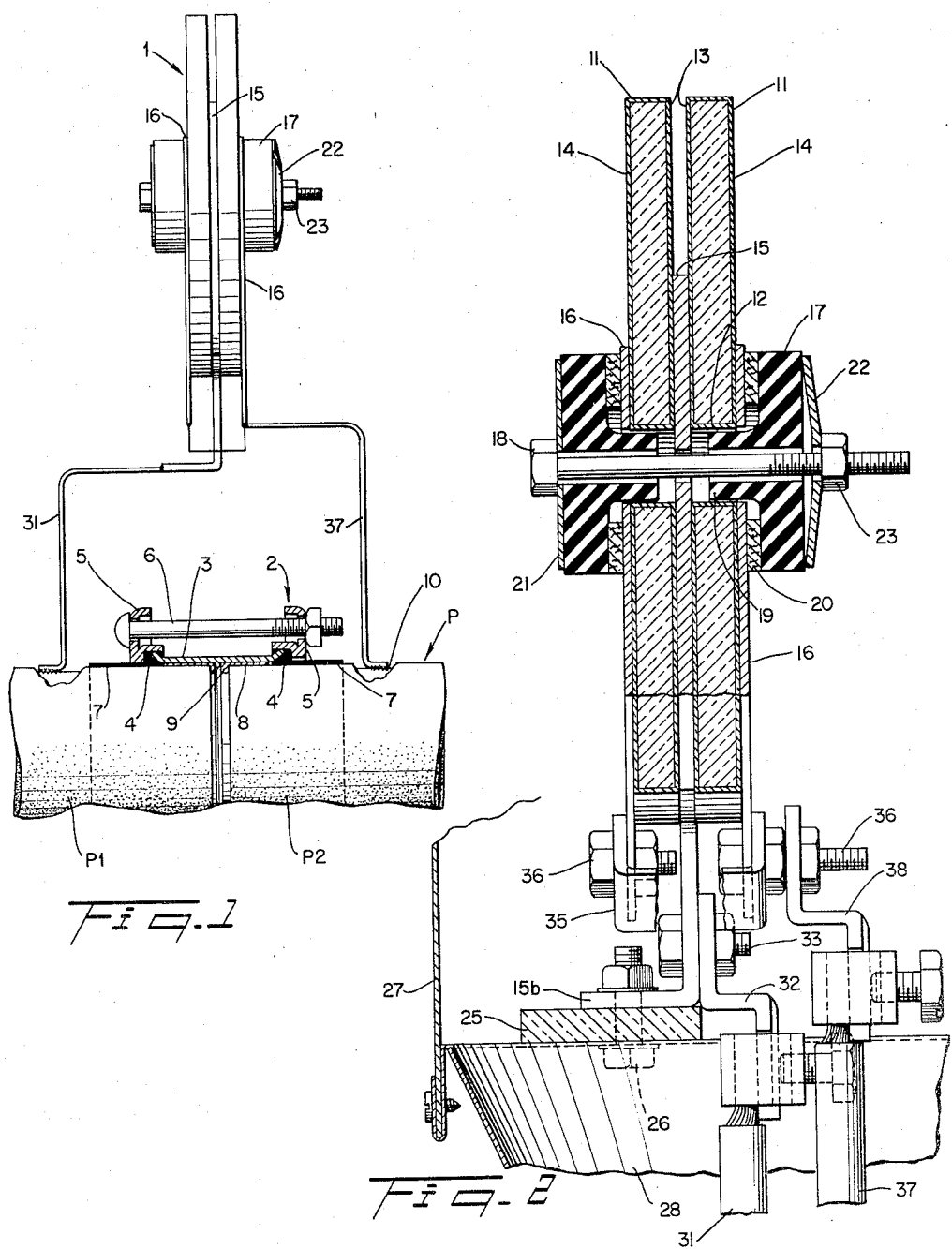

United States Patent Office 2,959,692
Patented Nov. 8, 1960

2,959,692

PROTECTIVE DEVICE FOR INSULATING COUPLING IN PIPE LINE

Paul F. Marx, Bradford, Pa., assignor to Dresser Industries, Inc., Dallas, Tex., a corporation of Delaware Filed Jan. 2, 1958, Ser. No. 706,866

6 Claims. (Cl. 307—95)

The present invention relates to the protection of pipe lines.

A cause of corrosion of underground pipe lines is that ground currents from electrical power systems, electric railways or other sources concentrate in and travel along a pipe line and produce electrolytic action where the current enters and leaves the pipe. To minimize corrosion of this kind, the pipe line is coated or wrapped with an electrically insulating covering and insulating pipe couplings are installed at selected points along the line to insulate successive pipe sections from one another and thereby block the flow of current through the line. An insulating coupling suitable for such use is shown in U.S. Patent 2,269,695 and comprises an insulating collar fitting over the end of the pipe and insulating gaskets to isolate the pipe from the coupling and from the next adjacent section of pipe. The space limitations in a pipe coupling restrict the thickness of insulation and also the arc-over distances between metallic parts that can be provided in a coupling of practical design. By reason of these limitations, the coupling is capable of withstanding only relatively low voltages, for example less than 4,000 volts. As ground currents are usually of low voltage, an insulating coupling has an adequate margin of safety under normal conditions. However, an underground pipe line is occasionally subjected to surges of electrical energy, for example when lightning strikes near the pipe line or strikes a structure connected to the line. Such surges are of high current value and may produce high voltages exceeding for example 5,000 volts. When an insulating coupling is subjected to voltages of this order, the resulting arc-over between metal coupling parts may fuse the parts together or may burn intervening gasket or insulating material to produce carbon deposits which short circuit the coupling and thereby destroy its insulating properties.

It is an object of the present invention to protect insulating couplings in a pipe line from damage by electrical current surges of high voltage and high current value. In accordance with the invention, an insulating coupling in a pipe line is protected by a device connected in parallel across the coupling and comprising discs of semi-conducting material which are spaced apart and parallel to one another, the material of the discs having non-linear resistance characteristics with a high electrical resistance at low voltage and low electrical resistance at high voltage, an inner electrode interposed between the discs and in electrical contact with the inner faces of the discs, two outer electrodes in electrical contact with the outer faces of the discs respectively and low resistance, high current capacity conductors electrically connecting both of the outer electrodes with the pipe on one side of the insulating coupling and electrically connecting the inner electrode with the pipe on the other side of the coupling. Under normal conditions the protective device is non-conducting and does not short circuit the insulating coupling. However, when the coupling is subjected to a surge of electrical energy, the protective device becomes conductive with a high current capacity and low resistance so that it permits passage of the surge without damage to the insulating coupling. When the surge has passed, normal conditions are automatically restored and the device again becomes non-conductive.

The nature and advantages of the invention will be more fully understood from the following description and claims in conjunction with the accompanying drawings which illustrate by way of example a preferred embodiment of the invention and in which:

Fig. 1 is a schematic elevational view illustrating an insulating pipe coupling installed on a pipe line and a protective device associated with the coupling in accordance with the invention.

Fig. 2 is a sectional view of the protective device, the section being taken approximately on the line 2—2 in Fig. 3.

Figure 3:
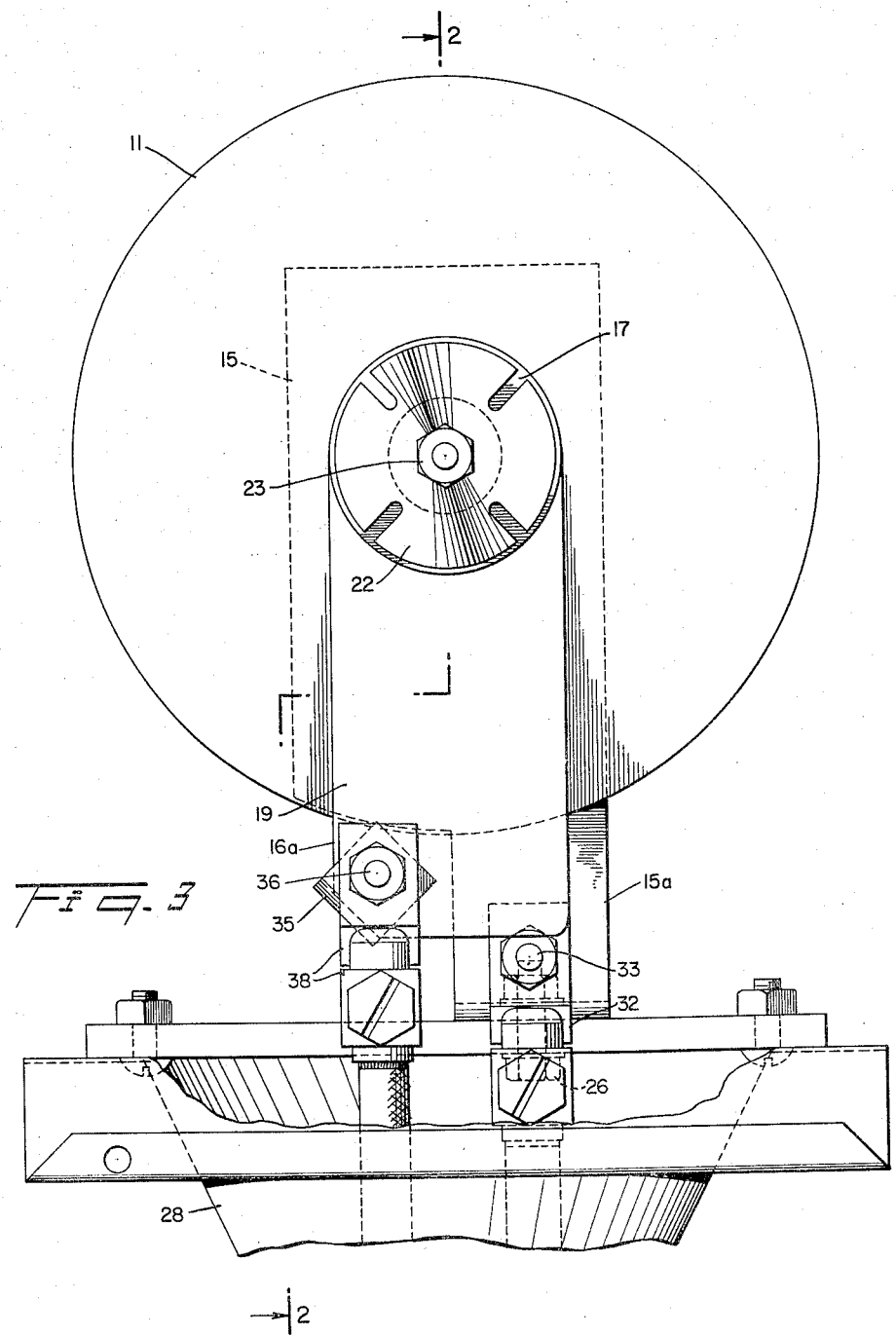
Fig. 3 is a side elevation of the protective device.

In Fig. 1 there is shown by way of example a protective device 1 in accordance with the invention installed on a pipe line P comprising pipe sections P1 and P2 which are joined end-to-end by an insulating coupling 2 which provides a fluid-tight joint between the pipe sections while electrically insulating them from one another. The coupling is shown as comprising an annular middle ring or sleeve 3, the ends of which are flared outwardly to provide recesses to receive gaskets 4 formed of rubber composition or other elastomer material which is resilient, elastic and electrically insulating. The outer faces of the gaskets are engaged by follower rings 5 which are drawn toward one another by a plurality of bolts 6 to apply pressure to the gaskets and thereby provide a fluid tight seal between each of the pipe sections and the middle ring 3. At least one of the gaskets is provided with an annular skirt portion 7 which projects axially beyond the associated follower ring and electrically insulates the follower ring from the pipe. A sleeve or collar 8, for example of insulating material, polyethylene or other plastic material, fits over the end portion of at least one pipe section P2 and insulates the pipe from the middle ring 3. An inwardly projecting lip 9 on the sleeve 8 engages the end of the pipe section P2 and insulates the two pipe sections from one another. It will thus be seen that the coupling 2 provides an insulated joint between the pipe sections P1 and P2. The pipe is preferably covered with an asphaltic or other covering 10 which protects the pipe against corrosion and also provides electrical insulation between the pipe and the ground. The coupling 2 is preferably also provided with a protective covering or coating.

The coupling device 1 is shown in more detail in Figs. 2 and 3 as comprising a plurality of discs formed of semi-conducting material having non-linear resistance characteristics with a high electrical resistance at low voltage and low electrical resistance at high voltage. While only two such discs are shown in the drawings, it will be understood that more may be used if desired. The discs 11 are shown as being of circular shape with central holes 12 and are disposed coaxial with one another with a space between the discs. The inner faces 13 and outer faces 14 of the discs 11 are preferably coated or otherwise treated to provide good electrical conductivity. For example a sprayed metal coating is applied to the faces. An inner electrode 15 is interposed between the discs 11 and is in electrical contact with the inner faces 13 of both discs. Outer electrodes 16 engage the outer faces 14 of the discs. The electrodes 15 and 16 are formed of aluminum, copper or other metal having good electrical conductivity and engage the respective faces of the discs 11 over large areas of contact so as to provide high current capacity with low concentration.

The discs 11 and electrodes 15 and 16 are held in assembled relation by insulating bushings 17 and a bolt 18 that extends through holes in the bushings and through aligned holes in the discs and the electrodes. Each of the bushings 17 has a neck portion 19 that extends through a hole in the outer electrode 16 and into the central hole 12 of the associated disc 11. The insulators 17 are preferably formed of ceramic material or other strong material having a high dielectric strength. A ring or washer 20 of cork or other resilient insulating material is interposed between each of the insulators 17 and the respective electrode 16. A flat metal washer 21 is shown provided at one end of the bolt 18 while on the other end there is a convex spring washer 22. When a nut 23 on the bolt 18 is screwed tight, the assembly comprising the discs 11 and the electrodes 15 and 16 is pressed tightly together so as to provide good electrical contact between the electrodes and the faces of the discs. The spring washer 22 assures that a selected pressure between the electrodes and the discs is maintained at all times despite thermal contraction and expansion of the parts or other varying conditions.

The central or inner electrode 15 has a portion 15a of reduced width which projects radially beyond the peripheries of the discs 11 and terminates in an angular portion 15b which is secured to an insulating support member 25 by a screw or bolt 26. The assembly comprising the discs 11 and the electrodes 15 and 16 is thereby mounted on and supported by the insulating member 25. The inner electrode 15 is sufficiently thick to provide a rugged mounting of the assembly. The supporting member 25 is in turn suitably mounted in a removable watertight casing 27 mounted on a suitable stand or support 28.

The inner electrode 15 is electrically connected with one of the pipe sections P1 by a heavy electrical conductor 31, one end of which is shown connected to the inner electrode by a heavy lug or fitting 32 and a bolt 33. The other end is electrically connected to the pipe section P1 near the coupling 2 for example by a suitable clamp or fitting or by being welded to the pipe as illustrated in the drawing.

The outer electrodes 16 have portions 16a which project radially beyond the peripheries of the discs 11 and are electrically connected to one another by a heavy jumper or connector bar 35 and bolts 36. It will be seen that by reason of the reduced width of the projecting portion 15a of the central electrode, the connecting bar 35 between the outer electrodes is sufficiently spaced from the projecting portion of the center electrode to avoid sparking between the electrodes. Both outer electrodes 16 are electrically connected to the other section of pipe P2 by a heavy conductor 37, one end of which is connected to the outer electrodes by a suitable lug or fitting 38 and one of the bolts 36. The other end of the conductor 37 is connected to the pipe section P2 adjacent the coupling 2 by a suitable clamp or fitting by welding as shown in the drawing. The conductors 31 and 37 are sufficiently large to provide a current carrying capacity of several thousand amperes. The associated fittings and the electrodes likewise have a high curent carrying capacity.

For convenience of installation, inspection and maintenance the protective device 1 in its removable watertight housing 27 is preferably installed above ground, being supported on the stand 28. The conductors 31 and 37 extend down through the stand 28 and are connected to the pipe sections of the underground pipe line as described. The conductors 31 and 37 are preferably covered with rubber or other suitable insulating material.

It will be seen that with the connections shown and described, the protective device comprising the discs 11 formed of semi-conducting material is connected across the insulating pipe coupling 2 and is thus in parallel with the pipe coupling. Moreover, since the outer electrodes 16 are connected with one another by the bar 35 the discs 11 are connected in parallel with one another. In order to avoid shorting out the insulating coupling 2 and thereby destroying its efficacity, the discs 11 must have a high electrical resistance at the low voltages which normally occur in an underground pipe line by reason of ground currents. For satisfactory results, the electrical resistance of the discs 11 connected in parallel with one another is at least 3,000 megohms at low voltage. However, in order to permit the passage of strong surges of electrical energy, the discs 11 connected in parallel with one another need to have low resistance and high current carrying capacity at high voltage. At voltages above 2,000 volts the discs connected in parallel should have a resistance of the order of 1 ohm or less and a current carrying capacity of at least 2,000 amperes. The semi-conducting material forming the discs 11 and the physical shape and dimensions of the discs are accordingly selected to provide these characteristics. A suitable material comprises silicon carbide with a suitable ceramic binder subjected to high pressure followed by a firing operation at high temperature of, for example, 100° C. To provide adequate current carrying capacity, the discs 11 should have a diameter at least of the order of 6 inches. The thickness of the discs is preferably of the order of ⅜ inch to ½ inch. A protective device constructed in accordance with these characteristics has been found to be capable of passing a surge current of 5,000 amperes with a voltage drop of approximately 4,000 volts. As a satisfactory insulating coupling is capable of withstanding a voltage of this order, the protective device in accordance with the invention assures protection of the coupling against breakdown by reason of electrical surges while at the same time preserving the insulating properties of the pipe joints.

Under normal conditions, the protective device 1 is non-conducting and hence the flow of current through the pipe line is blocked by the insulating coupling 2. In the event lightning strikes near the pipe line or strikes a structure connected with the pipe line, a surge of electrical energy travels along the pipe line. When it reaches the insulating coupling, the protective device is subjected to high voltage and the discs 11 thereupon become highly conductive to permit passage of the surge around the insulating coupling. The protective device thereby prevents voltage produced by the surge from building up to a value that would rupture the insulation of the coupling. When the surge has passed, the voltage drops and the discs 11 again become non-conductive. The protective device is thereby automatically restored to its normal condition and the sections P1 and P2 of the pipe line are again insulated from each other to prevent the flow of ground currents along the pipe line.

While a preferred embodiment of the invention has been illustrated in the drawings, and particularly described, it will be understood that the invention is not limited to this embodiment and that the structure and proportions may be modified without departing from the spirit of the invention.

What I claim and desire to secure by Letters Patent is:

1. An insulated pipe line comprising two electrically-conducting pipe members, means connecting said members in a fluid tight joint, insulating means electrically insulating said members from one another, a watertight housing located near the joint between said pipe members, two discs of semi-conducting material mounted in said housing, said discs being spaced apart and parallel to one another, the material of said discs having non-linear resistance characteristics with a high electrical resistance at low voltage and low electrical resistance at high voltage, an inner electrode interposed between said discs and in electrical contact with the inner faces of both discs, two outer electrodes in electrical contact with the outer faces of said discs respectively and low resistance high current capacity conductors electrically connecting both of said outer electrodes with one of said pipe members and electrically connecting said inner electrode with the other of said pipe members.

2. An insulated pipe line according to claim 1, in which said discs are formed of silicon carbide bonded with a ceramic binder.

3. An insulated pipe line according to claim 2, in which each of said discs is circular with a diameter of the order of six inches and a thickness of the order of three eighths of an inch.

4. An insulated pipe line according to claim 1, in which said discs and electrodes have an aligned central hole and further comprising a resilient annular washer engaging the outer face of each of said outer electrodes and surrounding said hole, a bushing of insulating material having a face bearing on each of said washers and a central neck portion extending into said hole in the adjacent outer electrode and disc, said bushings having aligned central bores, and a bolt extending through the bores of said bushings.

5. A protective device according to claim 4, further comprising resilient means associated with said bolt and acting between said bolt and said discs and electrodes to exert a continuous yielding force pressing said discs and electrodes into firm contact with one another.

6. An insulated pipe line according to claim 1, in which opposite faces of each of said discs have a metallic coating.

References Cited in the file of this patent

UNITED STATES PATENTS

| | | |
|---|---|---|
| 2,248,608 | Camilli | July 8, 1941 |
| 2,761,979 | Wilson | Sept. 4, 1956 |

FOREIGN PATENTS

| | | |
|---|---|---|
| 541,542 | Great Britain | Dec. 1, 1941 |